United States Patent [19]
Mahoney

[11] Patent Number: 5,964,489
[45] Date of Patent: Oct. 12, 1999

[54] APPARATUS FOR SUPPORTING AND MANIPULATING ORNAMENTS AND OTHER OBJECTS

[76] Inventor: Kevin Mahoney, 1880 Palmer Dr., Pleasanton, Calif. 94588

[21] Appl. No.: 09/075,379

[22] Filed: May 8, 1998

[51] Int. Cl.⁶ .............................. B25J 1/04; F16M 13/02
[52] U.S. Cl. ........................... 294/24; 294/19.1; 248/339; 248/544
[58] Field of Search ......................... 294/2, 19.1, 22–24, 294/26, 85; 248/339, 340, 343, 544, 303

[56] References Cited

U.S. PATENT DOCUMENTS

| | | | |
|---|---|---|---|
| 103,627 | 5/1870 | Lamb ......................................... | 294/24 |
| 828,012 | 8/1906 | Armstrong ................................ | 294/24 |
| 1,197,139 | 9/1916 | Mastin .................................... | 294/19.1 |
| 1,217,680 | 2/1917 | Bagby ..................................... | 294/24 |
| 1,248,843 | 12/1917 | Gay . | |
| 4,664,350 | 5/1987 | Dodds et al. . | |
| 4,742,979 | 5/1988 | Syversten et al. . | |
| 5,390,970 | 2/1995 | Gray . | |
| 5,553,905 | 9/1996 | Bentivegna . | |
| 5,560,975 | 10/1996 | Casper . | |
| 5,575,470 | 11/1996 | Sherman . | |
| 5,613,719 | 3/1997 | Anderson ................................ | 294/19.1 |
| 5,816,558 | 10/1998 | Sommer et al. ......................... | 248/544 |

FOREIGN PATENT DOCUMENTS 537581   5/1959   Belgium .............................. 294/19.1

*Primary Examiner*—Dean J. Kramer
*Attorney, Agent, or Firm*—Thomas R. Lampe

[57] ABSTRACT

Apparatus for supporting and manipulating ornaments and other objects includes a double-ended support hook for attachment to an object and having a segment forming a hook recess between the ends of the support hook. A support member supports the support hook, the support member including spaced side elements forming an interior for receiving the support hook and a hook engagement member located between the spaced side elements for engaging the support hook and positioning within the hook recess.

18 Claims, 3 Drawing Sheets

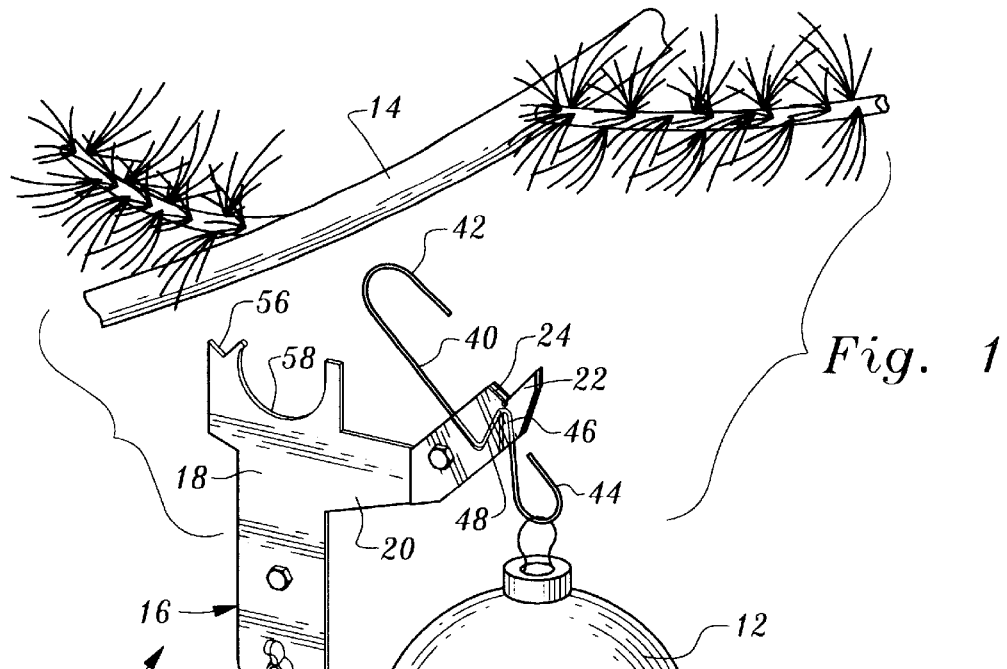
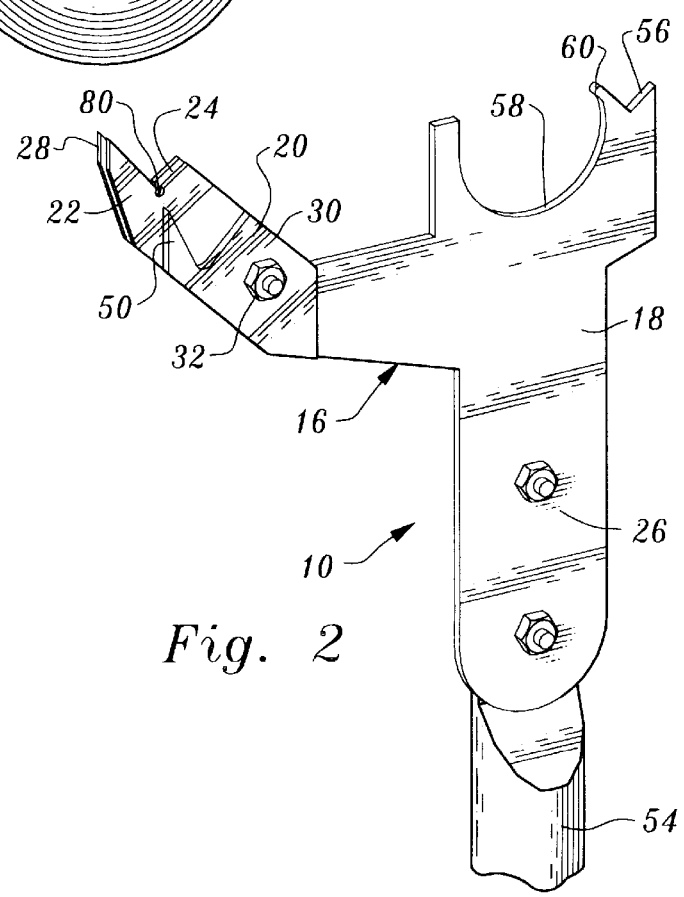
Fig. 1
Fig. 2

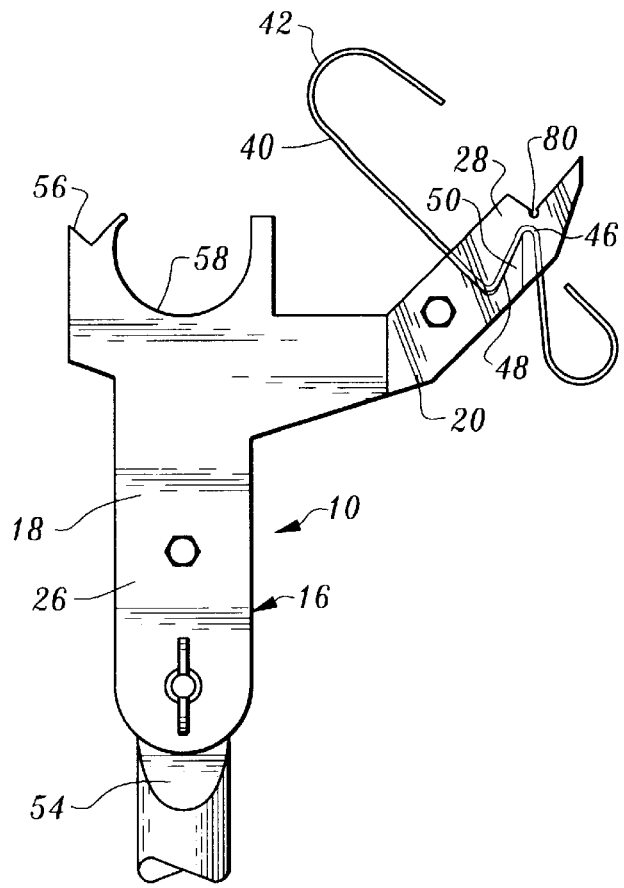
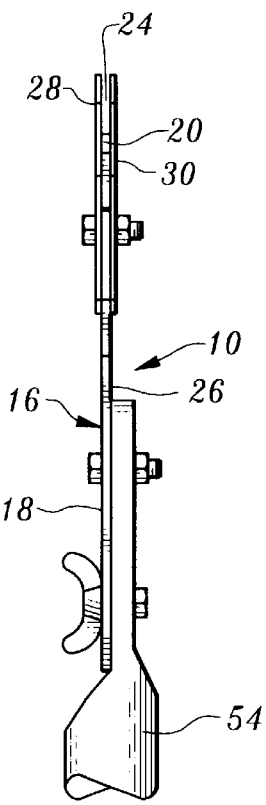
Fig. 3    Fig. 4
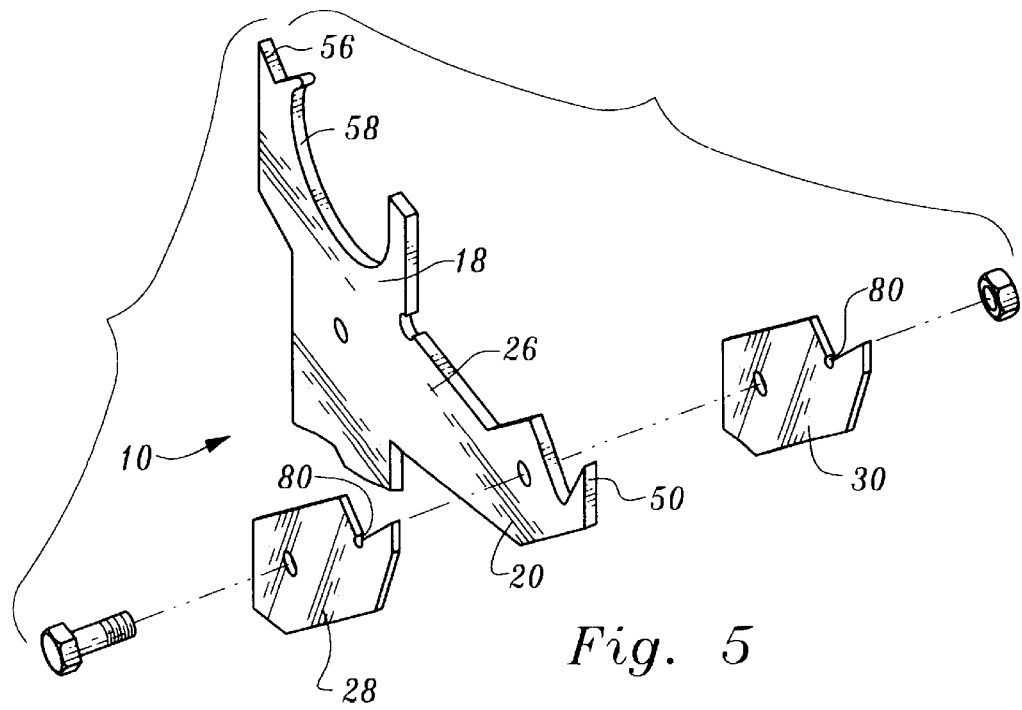
Fig. 5

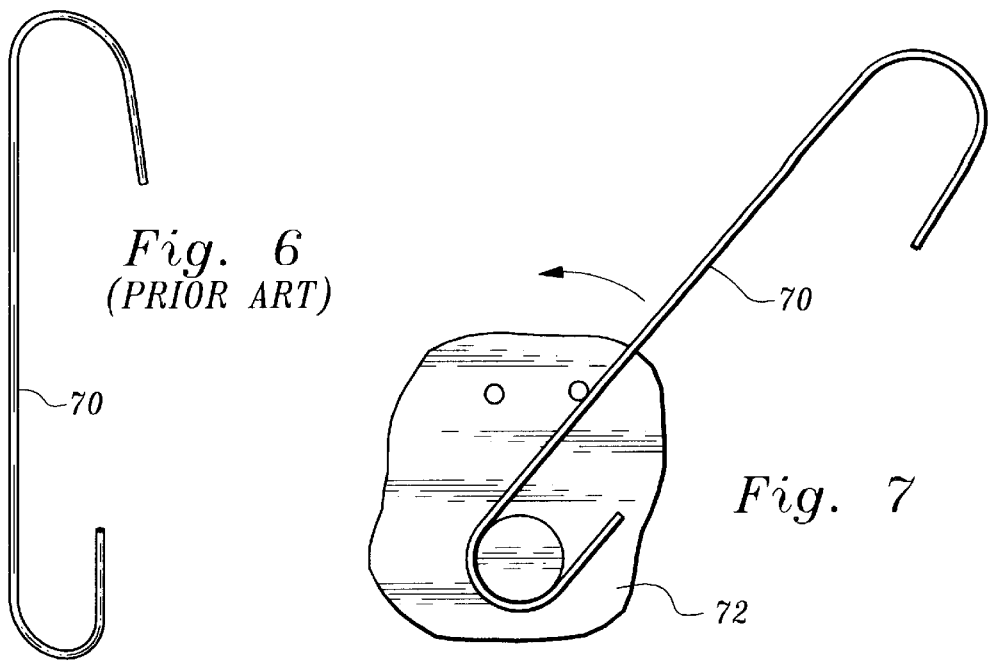
Fig. 6 (PRIOR ART)
Fig. 7
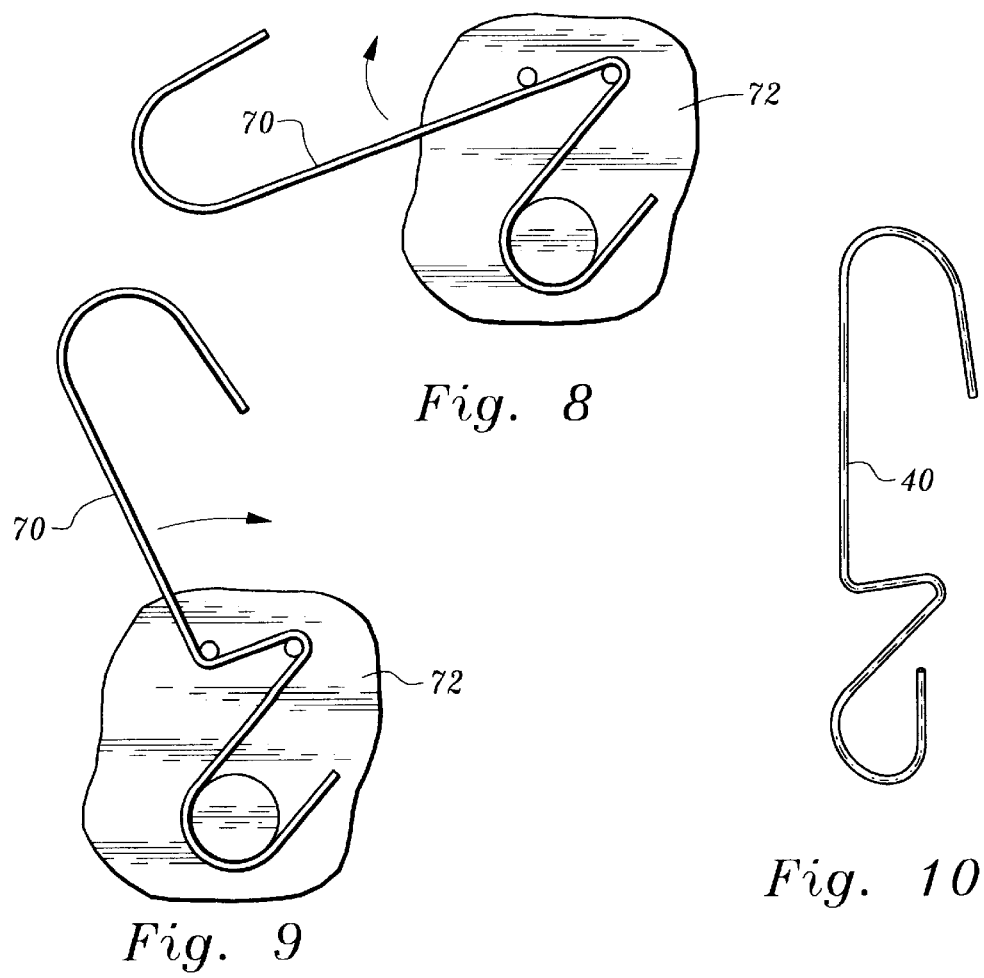
Fig. 8
Fig. 9
Fig. 10

APPARATUS FOR SUPPORTING AND MANIPULATING ORNAMENTS AND OTHER OBJECTS

TECHNICAL FIELD

The present invention relates to apparatus utilized to support and manipulate objects. The apparatus has particular application to the installation and removal of Christmas tree ornaments, light strands and other decorative objects.

BACKGROUND OF THE INVENTION

Difficulties are often encountered when hanging Christmas tree ornaments, lights and other decorative objects, particularly when the objects are located or are to be located at elevated or other difficult to access locations. Locating ornaments and the like on Christmas trees presents particular problems in view of the fact that the ornaments or other objects to be installed or removed are often fragile and further in view of the fact that the Christmas tree branches are often awkward to deal with and interfere with installation or removal.

Many devices have been devised to assist in the installation and removal of Christmas tree ornaments and other objects. The following United States patents disclose devices which are believed to be representative of the current state of the prior art in this field: U.S. Pat. No. 5,553,905, issued Sep. 10, 1996, U.S. Pat. No. 5,560,975, issued Oct. 1, 1996, U.S. Pat. No. 5,390,970, issued Feb. 21, 1995, and U.S. Pat. No. 5,575,470, issued Nov. 19, 1996.

As described in greater detail below, the apparatus of the present invention incorporates a double-ended support hook of specialized construction to interconnect one object to another, for example a Christmas tree ornament to a Christmas tree branch. Applicant is aware of the following U.S. patents relating to hangers or supports for objects: U.S. Pat. No. 1,248,843, issued Dec. 4, 1917, U.S. Pat. No. 4,742,979, issued May 10, 1998, and U.S. Pat. No. 4,664,350, issued May 12, 1987.

None of the U.S. patents referenced above disclose the unique combination of structural elements disclosed and claimed herein which cooperate in a unique manner to provide ease of use and provide a highly reliable approach to the installation and removal of Christmas tree ornaments and other objects. The invention disclosed and claimed herein is characterized by its relative simplicity, ease of use, and reliability.

DISCLOSURE OF INVENTION

The present apparatus is for supporting and manipulating ornaments and other objects. The apparatus includes a double-ended support hook for attachment to an object and having a hook segment forming a hook recess between the ends of the support hook.

A support member is provided for supporting the support hook. The support member includes spaced side elements defining a support member interior for receiving the support hook and a hook engagement member located between the spaced side elements for engaging the support hooks with the hook engagement member disposed within the hook recess.

Other features, advantages, and objects of the present invention will become apparent with reference to the following description and accompanying drawings.

BRIEF DESCRIPTION OF DRAWINGS

FIG. 1 is a perspective view illustrating apparatus constructed in accordance with the teachings of the present invention being utilized to install a Christmas tree ornament on the branch of a tree;

FIG. 2 is a perspective view of the support member of the apparatus connected to a handle;

FIG. 3 is a side view of the support member supporting a double-ended support hook employed when carrying out the teachings of the present invention;

FIG. 4 is a side view of the support member and attached handle;

FIG. 5 is an exploded, perspective view illustrating structural details of a portion of the support member;

FIG. 6 illustrates a typical prior art hook formed from wire;

FIGS. 7–9 illustrate sequential steps carried out in the formation of a support hook employed in the present invention from a prior art hook; and FIG. 10 illustrates a support hook incorporating features of the present invention.

BEST MODE FOR CARRYING OUT THE INVENTION

Referring now to the drawings, apparatus constructed in accordance with the teachings of the present invention is generally designated by reference numeral 10. FIG. 1 illustrates the apparatus being utilized to attach a Christmas tree ornament 12 to a Christmas tree branch 14.

The apparatus includes a support member 16 which has a primary support member portion 18 and a supplemental support member portion 20 projecting laterally therefrom. The supplemental support member portion has a distal end 22 which is bifurcated to define a support member interior or channel 24.

In the arrangement illustrated, the support member 16 is formed by three clear plastic plates 26, 28, 30 secured together by a mechanical fastener 32; however, other suitable forms of construction and types of materials may be utilized. For example, the support member may be of integral plastic molded construction or formed from metal. Also, the support member may have a more artistic or aesthetic appearance, for example that of an angel, reindeer, or other holiday symbol.

The support member interior 24 is for the purpose of receiving a support hook 40 which suitably may be formed from an integral piece of bent wire. The support hook 40 has two bent or curved ends 42, 44. In FIG. 1 bent end 44 supports the Christmas tree ornament 12 and the bent end 42 is for the purpose of receiving Christmas tree branch 14.

The support hook 40 is elongated and differs from conventional Christmas tree ornament support hooks in that it has been bent to form a segment 46 located between the ends 42, 44 thereof defining a hook recess 48 located between two angularly disposed legs of the segment 46.

Support member 16 includes a hook engagement member in the form of a protrusion 50 which is located between the side elements or plates 28, 30 within the support member interior. The hook engagement member 50 is sized and configured to engage the support hook 40 with the hook engagement member disposed within the recess 48 thereof when the support hook is positioned within support member interior 24.

FIGS. 1 and 3 illustrate the support hook 40 in position on the support member with the hook engagement member 50 of the support member disposed within recess 48 of the support hook. Plates 28, 30 are substantially parallel and the space therebetween is relatively narrow so that rotation of the support hook relative to the support member is restricted or prevented altogether.

The two bent ends 42, 44 of the support hook are disposed externally of the side elements or plates 28, 30 so that application or removal of the support hook and associated ornament are facilitated. Because rotation of the support hook is limited, a person using the apparatus can readily orient the support hook relative to the branch or other object from which the ornament is to be suspended. The support hook is readily disengaged from or engaged with the support member by the user. In the arrangement illustrated, a handle 54 is attached to the support member to provide added "reach".

The apparatus of the present invention is adapted to perform other tasks, for example, placement of electrical wiring, garlands and the like. Primary support member portion 18 defines two spaced support member recesses 56, 58, recess 56 being illustrated as being curved. Recesses 56, 58 are spaced from the support member interior 24 and are for the purpose of receiving objects such as light strands or garlands so that pushing or pulling of an object received therein through manipulation of the support member is facilitated. In the arrangement illustrated, a protrusion 60 at least partially defines recesses 56 and 58, the protrusion 60 being suitable for engagement with an object to pull same toward the user of the apparatus. Recess 80 in the supplemental support member portion is for receiving the support hook 40 when removing the ornament from a tree or other support and for preventing the hook from sliding off distal end 22.

FIG. 6 illustrates a conventional Christmas tree ornament hook 70 and FIG. 10 illustrates the support hook of the present invention.

FIGS. 7 and 9 illustrate sequential steps of a technique employed to convert the hook 70 to the support hook 40 wherein the hook 70 is bent about pegs of a peg board 72.

I claim:

1. Apparatus for supporting and manipulating ornaments and other objects, said apparatus comprising, in combination:

a double-ended support hook for attachment to an object and having a hook segment forming a hook recess between the ends of said support hook; and a support member for supporting said support hook, said support member including spaced side elements defining a support member interior for receiving said support hook and a hook engagement member located between said spaced side elements within said support member interior for engaging said support hook when said hook engagement member is disposed within said hook recess.

2. The apparatus according to claim 1 additionally comprising a handle connected to said support member.

3. The apparatus according to claim 1 wherein said support hook ends comprise bent ends, one of said bent ends for attachment to one object and the other of said bent ends for attachment to another object to interconnect said objects.

4. The apparatus according to claim 3 wherein said support hook projects outwardly and away from said support member and wherein said bent ends are disposed externally of said side elements when said hook engagement member is disposed within said hook recess and said support member engages said support hook.

5. The apparatus according to claim 1 wherein said side elements comprise spaced, substantially parallel plates.

6. The apparatus according to claim 1 wherein said hook segment is engageable with the side elements of said support member when said support member supports said support hook to restrict rotation of said support hook relative to said support member.

7. The apparatus according to claim 1 wherein said support member includes a primary support member portion and a supplemental support member portion attached to said primary support member portion and projecting laterally therefrom, said supplemental support member portion having a distal end, and said support member interior for receiving said support hook and said hook engagement member being located at said distal end.

8. The apparatus according to claim 1 wherein said support member defines at least one support member recess spaced from said support member interior for receiving an object to facilitate pushing or pulling of an object received by said support member recess by said support member.

9. The apparatus according to claim 8 wherein said support member defines a plurality of support member recesses, the support member recesses of said plurality of support member recesses being spaced from one another.

10. The apparatus according to claim 8 wherein said at least one support member recess is curved.

11. The apparatus according to claim 8 wherein said support member includes an object engaging protrusion for engaging an object, said protrusion partially defining said at least one support member recess.

12. Apparatus for supporting and manipulating ornaments and other objects having a support hook attached thereto including a hook segment defining a hook recess, said apparatus comprising a support member for supporting a support hook, said support member including spaced side elements defining a support member interior for receiving said support hook and a hook engagement member located between said spaced side elements within said support member interior for engaging said support hook when said hook engagement member is disposed within said hook recess.

13. The apparatus according to claim 12 additionally comprising a handle connected to said support member.

14. The apparatus according to claim 12 wherein said side elements comprise spaced, substantially parallel plates.

15. The apparatus according to claim 12 wherein said support member includes a primary support member portion and a supplemental support member portion attached to said primary support member portion and projecting laterally therefrom, said supplemental support member portion having a distal end, and said support member interior for receiving a support hook and said hook engagement member being located at said distal end.

16. The apparatus according to claim 12 wherein said support member defines at least one support member recess spaced from said support member interior for receiving an object to facilitate pushing or pulling by said support member of an object received by said recess.

17. The apparatus according to claim 16 wherein said support member defines a plurality of support member recesses, the support member recesses of said plurality of support member recesses being spaced from one another.

18. The apparatus according to claim 16 wherein said support member includes an object engaging protrusion for engaging an object, said protrusion partially defining said at least one support member recess.

* * * * *